United States Patent
Ragusa

(10) Patent No.: US 9,396,518 B2
(45) Date of Patent: Jul. 19, 2016

(54) SYSTEM OF ORGANIZING DIGITAL IMAGES

(71) Applicant: Salvadore Ragusa, Jefferson, LA (US)

(72) Inventor: Salvadore Ragusa, Jefferson, LA (US)

(*) Notice: Subject to any disclaimer, the term of this patent is extended or adjusted under 35 U.S.C. 154(b) by 0 days.

(21) Appl. No.: 14/637,341

(22) Filed: Mar. 3, 2015

(65) Prior Publication Data

US 2015/0177966 A1  Jun. 25, 2015

Related U.S. Application Data

(63) Continuation-in-part of application No. 13/472,212, filed on May 15, 2012, now abandoned.

(51) Int. Cl.
*G06T 3/20* (2006.01)
*G06T 3/00* (2006.01)
*G06T 3/40* (2006.01)
*H04N 1/00* (2006.01)

(52) U.S. Cl.
CPC .............. *G06T 3/20* (2013.01); *G06T 3/0006* (2013.01); *G06T 3/40* (2013.01); *H04N 1/00198* (2013.01)

(58) Field of Classification Search
CPC ... G06F 3/04842; G06F 3/1423; G06F 3/005; G06F 3/0483; G06F 3/1257; G06F 17/212; G06F 2203/04803
See application file for complete search history.

(56) References Cited

U.S. PATENT DOCUMENTS

| | | | | |
|---|---|---|---|---|
| 5,633,726 A * | 5/1997 | Timmermans | ................. | 386/246 |
| 6,181,836 B1 * | 1/2001 | Delean | ...................... | G06T 3/00 345/428 |
| 2002/0075243 A1 * | 6/2002 | Newton | ................. | G06F 3/0421 345/173 |
| 2003/0072486 A1 * | 4/2003 | Loui | ....................... | G06T 11/60 382/175 |
| 2003/0103234 A1 * | 6/2003 | Takabayashi | ....... | H04N 1/00132 358/1.15 |
| 2005/0243381 A1 * | 11/2005 | Hill | ..................... | H04N 1/00132 358/453 |
| 2006/0059427 A1 * | 3/2006 | Reid | ................. | G06F 17/30265 715/731 |
| 2006/0177132 A1 * | 8/2006 | Jackson | .............. | H04N 1/3873 382/173 |
| 2008/0225153 A1 * | 9/2008 | Fagans | ................. | G06F 3/0481 348/333.01 |
| 2009/0085918 A1 * | 4/2009 | Hollingworth | ........... | G06T 3/40 345/475 |
| 2009/0091635 A1 * | 4/2009 | Fukuyama | .................. | 348/220.1 |
| 2009/0256780 A1 * | 10/2009 | Small et al. | ..................... | 345/55 |
| 2009/0284637 A1 * | 11/2009 | Parulski | ............. | H04N 1/00183 348/333.12 |
| 2009/0315869 A1 * | 12/2009 | Sugihara et al. | .............. | 345/204 |
| 2010/0141683 A1 * | 6/2010 | van der Meulen | ..... | G09G 5/391 345/660 |
| 2010/0164992 A1 * | 7/2010 | Akiya | ..................... | G06T 11/60 345/641 |
| 2011/0026749 A1 * | 2/2011 | Yaun | ............................ | 381/333 |
| 2011/0285953 A1 * | 11/2011 | Liu | ......................... | G02F 1/292 349/141 |
| 2013/0239049 A1 * | 9/2013 | Perrodin | ............... | G06F 3/0481 715/800 |

OTHER PUBLICATIONS

Shutterfly, How to View and Edit Pictures—Nov. 26, 2011.*
Squaready Prepares Your Landscape and Portrait photos for Instagram, Jun. 6, 2011.*
Communicate: In Print, Sep. 29, 2009.*
Giinii 8", 2008.*

* cited by examiner

*Primary Examiner* — Tadeese Hailu
(74) *Attorney, Agent, or Firm* — Keaty Law Firm LLC

(57) ABSTRACT

A photography system uses electronically-readable software to process graphic objects that have been captured by a digital camera or scanned to an electronically-readable format for display on a square display screen. The images can be organized according to the aspect ratio, chronologically or according to other criteria selected by a user. The system operates to organize the displayed images in inform rows and/or columns on the page of the display screen and provides consistent per aspect ratio image size for horizontal and vertical images and unrestricted on-screen image placement.

22 Claims, 8 Drawing Sheets

SYSTEM OF ORGANIZING DIGITAL IMAGES

This is a Continuation In Part claiming priority of pending U.S. patent application Ser. No. 13/472,212 filed 15 May 2012, which is incorporated here by reference.

BACKGROUND OF THE INVENTION

The present invention relates to a system for creating, editing, and displaying digital photographs and similar electronically created images. More specifically, the present invention relates to a system which allows a photographer to upload and display photographs in a digital photo album.

Digital photography has largely replaced the chemical-based labor-intensive processes of conventional photography. The advantage of digital over conventional photography are too numerous to mention, but suffice it to say that one entire industry has nearly disappeared only to be replaced by the other.

Photographs taken by digital methods can be displayed on computers, cameras, laptops, cell phones, etc. To capture these photos for safekeeping, the photographer can have the digital images printed and/or saved to a disk or memory card. The photographer can also upload images to digital photo albums. From camera to computer, video displays are now the most prevalent viewing method, with printed photos running a distant second.

For all of the advantages digital photography offers, the final presentation of images on video displays leaves something to be desired even though it has nothing to do with the quality of current displays. Even the screen of a smart phone is capable of rendering stunning images, while computer monitors and tablets offer larger and even higher quality images. The problem is that these devices all share a common flaw: their rectangular shape, which makes the ability to view a series of still photographs seem more like an afterthought, a last minute feature added to a video display.

The problem is most evident when photos are viewed on television and computer monitors because, in addition to being rectangular, their physical orientation is fixed in the horizontal/landscape position. This means that when a person views a vertical/portrait photo, it must be compressed by 50% to fit within the short side (height) of the screen. On the other hand, when a user displays a horizontal/landscape image on the horizontal/landscape positioned screen, the image fills 100% of the screen. When one considers a slideshow where some images fill the entire screen, while other images are half-sized the problem becomes apparent. The situation is better with tablets, digital photo frames or smart phones. They are portable and can be easily rotated to match their orientation to the image but require many steps while viewing a slideshow.

Despite all of the advances that have been made in video displays, the problem of inconsistent image sizing has not been addressed. The present invention contemplates elimination of drawbacks associated with conventional photography systems and provision of a system that maintains equal image size of a photograph regardless of orientation.

SUMMARY OF THE INVENTION

It is, therefore, an object of the present invention to provide a photography system, which allows to display images in an equal size format regardless of the uploaded image orientation.

It is another object of the invention to provide a digital photo album that allows display of portrait and landscape images filling the entire screen all the time without the need to physically rotate the device.

It is another object of the invention to provide a digital photo album that allows display of various portrait and landscape images in any order, without the need for clustering or grouping, for instance, all horizontal or all vertical images together.

These and other objects of the invention are achieved through a provision of photography system employing a display device having a square configuration screen. The square screen provides the additional space required for still photographs to rotate without altering their size. The transition between images on a square screen offers a more natural viewing experience because the image size remains constant regardless of the display orientation. Additionally, the square format is capable of displaying multiple image aspect ratios, notably 3:2 and 4:3, the two most commonly used in digital still photography.

The photography system of this invention uses electronically-readable software to process graphic objects that have been captured by a digital camera or scanned to an electronically-readable format for display on a square display screen. The images can be organized according to the aspect ratio, chronologically or according to other criteria selected by a user. The system operates to organize the displayed images in inform rows and/or columns on the page of the display screen.

DETAILED DESCRIPTION OF THE INVENTION

Figure 1A:
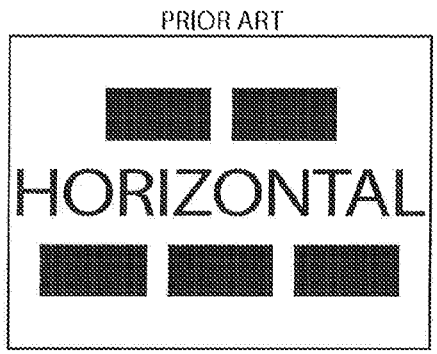
FIG. 1A illustrates a photograph taken in landscape (horizontal) format and displayed on a horizontal screen using a conventional system.

The first task in the implementation of the system of the present invention is to capture images that will be organized, processed, and displayed on an electronic device, such as for instance a digital photo frame. The system of the present invention does not deal with the image capture stage, which can be performed using any conventionally available electronic digital camera 10. The system of the present invention can be also used for processing, organizing and displaying non-digitally captured images that have been scanned and converted to an electronic image format.

The system of the present invention begins at a step, where images captured or acquired by electronic digital means are uploaded onto an interface device 12 that will be used to organize, manipulate, and process the images. The system of the present invention also allows digital images to be acquired from various different sources, not necessarily digital cameras, such as CD-ROMS, memory sticks, flash drives, and other suitable means.

The image processing portion of the system of the present invention provides a number of tools for organizing the acquired images. The software for the image processing is stored on a disk 15 and can be downloaded into the interface device 12 or directly to a digital photo frame 14 if the photo frame 14 has sufficient memory. Alternatively, the interface device 12 can be serially connected between the camera 10 and the digital photo frame 14 using standard connectors, cables, etc. In that case, the software can be downloaded to the digital photo frame 14. The software stored on the disk 15 provides for user-implemented steps that can be displayed on the screen 16 and operated through a user interface.

Conventional digital photo frames have rectangular displays of a pre-determined aspect ratio. Aspect ratio is the fractional relationship between the width and height of an image. The two most common aspect ratios for digital photo frames are 4:3 (also known as 4×3, 1.33:1, or standard) and 16:9 (16×9, 1.78:1, or widescreen). Some frames have the ability to display images in 4:3 or 16:9. Some frames offer "panoramic" viewing (generally considered to be 3:1 aspect ratio), though this format is somewhat of a rarity for most manufacturers.

Most pictures photographers take are probably 4:3 and 3:2 aspect ratio. If a frame only displays 16:9, the 4:3 pictures will either be cropped or stretched. Several other problems are encountered when trying to accommodate both landscape and portrait photos for display in a rectangular photo frame. Even though a photo frame should be able to display both horizontal and vertical images with equal native format, the images are often compressed or extended in the aspect ratio of the normative format. Many of these techniques involve projecting the normative image in its original format onto the native display and simply blackening the "gaps" where no image information exists.

Figure 2A:
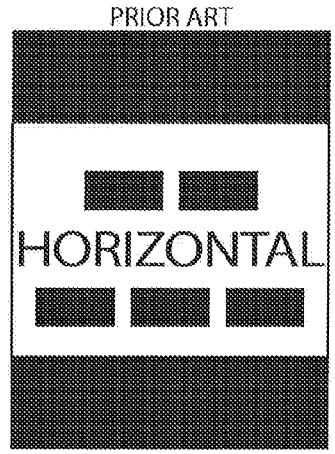
FIG. 2A illustrates a photograph taken in landscape (horizontal) format and displayed on a vertical screen using a conventional system.

Letterboxing is the practice of transferring wider photo formats to more square formats while preserving the original aspect ratio. The resulting video display must include masked-off areas above and below the picture area, often referred to as black bars, or mattes. An example of letterboxing is shown in FIG. 2A, where the native landscape image of FIG. 1A is displayed on a vertical screen.

Figure 1B:
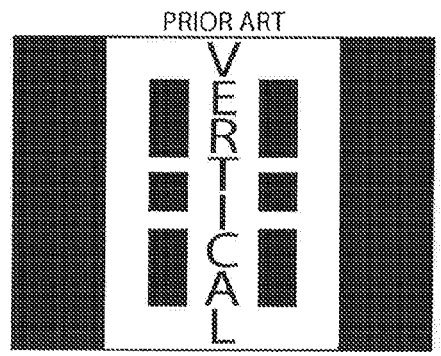
FIG. 1B illustrates a photograph taken in portrait (vertical) format and displayed on a horizontal screen using a conventional system.
Figure 2B:
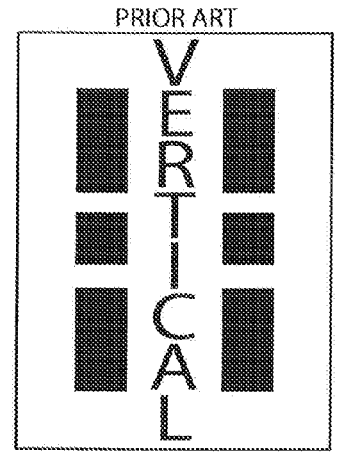
FIG. 2B illustrates a photograph taken in portrait (vertical) format and displayed on a vertical screen using a conventional system.

In contrast, pillarboxing is necessitated when a photo that was not originally designed for widescreen is shown on a widescreen display. An example of the image distortion is shown in FIG. 1/8, where the vertical photo of FIG. 2B is displayed on a horizontal screen of FIG. 1B. The original material is shrunk and placed in the middle of the widescreen frame while vertical black bars are placed on either side of the image. Lastly, there are sometimes instances in which standard ratio images are presented in the central portion of a letterboxed picture, resulting in a black border all around. This effect is referred to as matchboxing, and obviously wastes a great deal of screen space as well as reduces the resolution of the original image.

The present invention solves these problems by providing a system that utilizes a square display of a digital photo frame and software that processes photo images of various aspect ratios and orientation to fit within the square screen while utilizing maximum screen space.

The digital photo frame 14 is provided with a square screen 16, on which the processed images are displayed. The system allows the interface device 12 and/or the digital photo frame 14 to "know" the format and aspect ratio of the incoming signal it is receiving from the camera 10 and/or interface device 12 before the images are displayed on the screen 16. The processing software determines the nature of the image content that is, whether the image is landscape or portrait, and the aspect ratio of the image and converts the images for displaying on the square screen 16 as if all images have 1:1 aspect ratios.

Figure 3A:
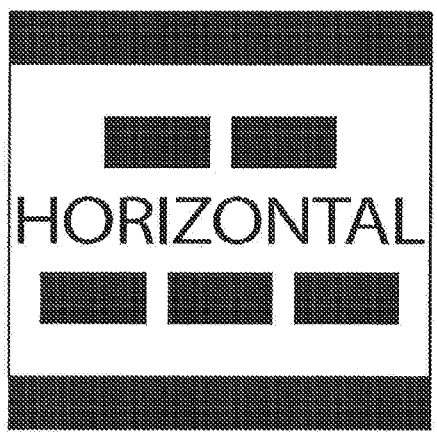
FIG. 3A illustrates a photograph taken in landscape (horizontal) format and displayed on a square screen using the system of the present invention.
Figure 3B:
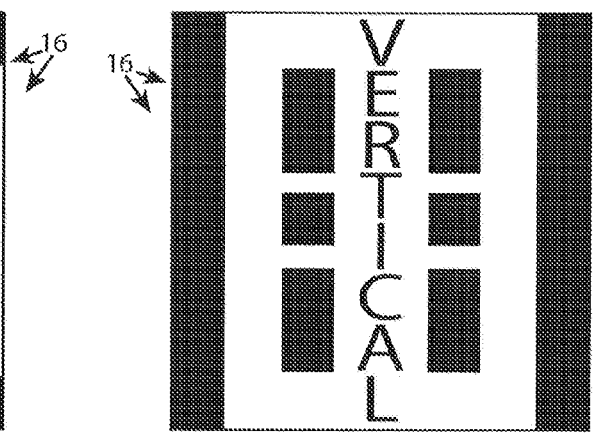
FIG. 3B illustrates a photograph taken in portrait (vertical) format and displayed on a square screen using the system of the present invention.
Figure 4:
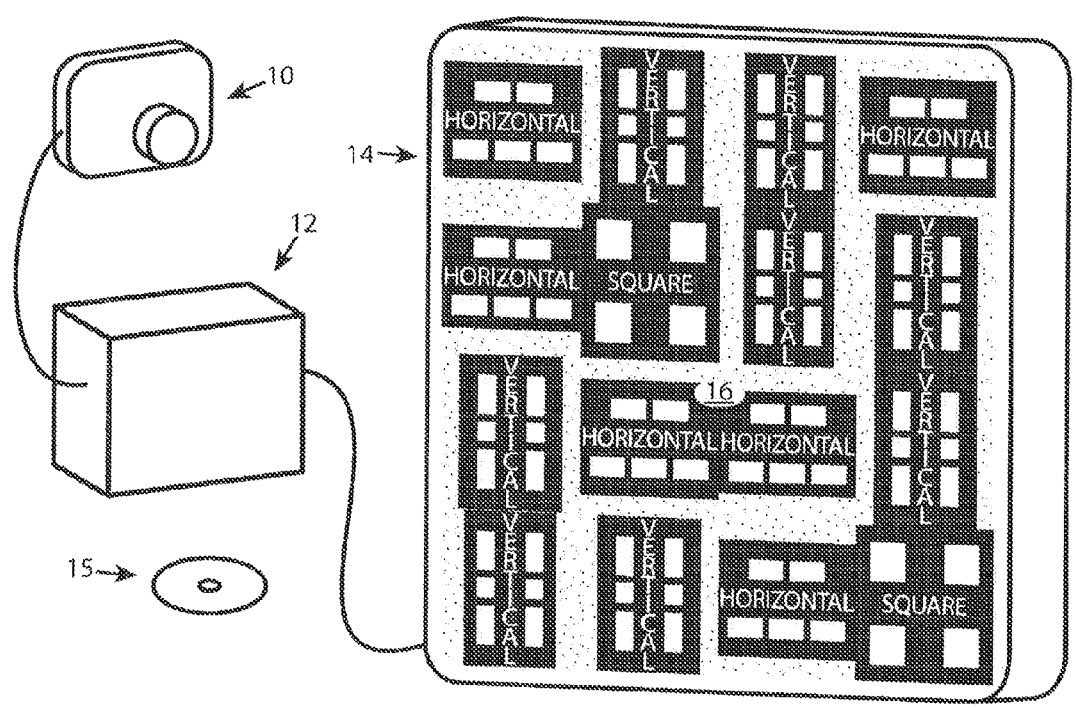
FIG. 4 illustrates the major hardware components of the system of the present invention.

In the case where a given display is letterboxed, pillarboxed, or both, the software also determines which portions of the image frame are real image and not the mattes such that appropriate and efficient image processing is accomplished. If the original image has an aspect ratio different than 4:3 or 3:2, fill, such as black space, is preferably added to "letterbox" the sides or the top and bottom of the image to retain the original proportionality of the image area. An example of a screen showing such black space imposed on a horizontal image is shown in FIG. 3A and an example of vertical pillarbox mattes is shown in FIG. 3B. In one aspect of the invention, the original image file is not modified or overwritten during this process.

Figure 5:
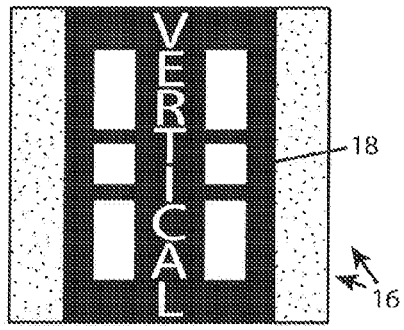
FIG. 5 illustrates a full-screen vertical image with aspect ratio 3:2 using the system of this invention.
Figure 6:
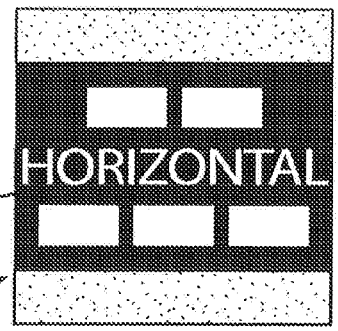
FIG. 6 illustrates a full-screen horizontal image with aspect ratio 3:2 using the system of this invention.

The digital photo frame of the present invention can be used to view single images, such as for instance shown in FIG. 5 and FIG. 6, where aspect ratio of the original photos is 3:2. Image size is 8×12", and an exemplary size of the screen is 12×12". In the drawings, the vertical (portrait) images and the horizontal (landscape) images are labeled. In this example, pillarbox mattes are formed on the sides of a vertical image 18, and letterbox mattes are formed on top and bottom of a horizontal image 20. Both images 18 and 20 are displayed on the screen 16 in their native format.

Figure 7:
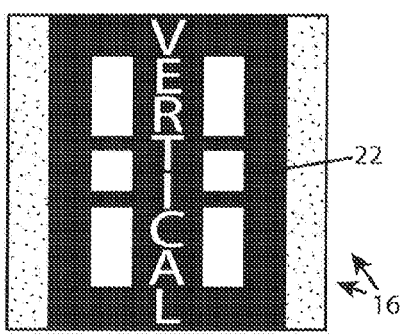
FIG. 7 illustrates a full-screen vertical image with aspect ratio 4:3 using the system of this invention.
Figure 8:
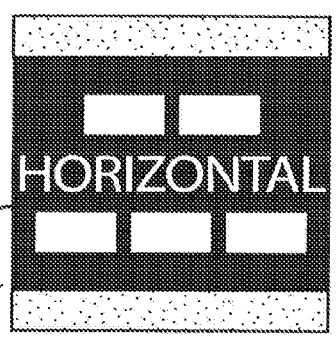
FIG. 8 illustrates a full-screen horizontal image with aspect ratio 4:3 using the system of this invention.

FIG. 7 and FIG. 8 illustrate display of a single 9×12" image with aspect ratio 4:3 on 12×12" screen 16. Similarly to FIG. 5, two pillarbox mattes are formed on both sides of the image 22, while in FIG. 8 two top and bottom letterbox mattes are formed for the image 24.

Figure 9:
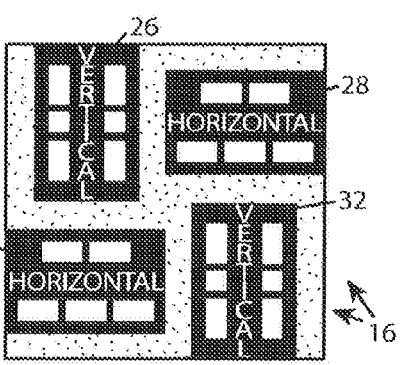
FIG. 9 illustrates a photo layout in four-image mode of both vertical and horizontal images with aspect ratio 3:2 using the system of this invention.
Figure 10:
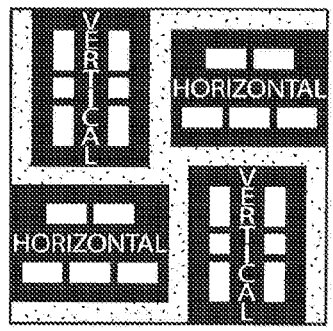
FIG. 10 illustrates a photo layout in four-image mode of both vertical and horizontal images with aspect ratio 4:3 using the system of this invention.

FIG. 9 illustrates display of a four 4×6" images with aspect ratio 3:2 on 12×12" screen 16. In this example, a vertical image 26 is rotated and fitted side-by-side to a horizontal image 28 in the upper row, and a reverse combination of horizontal to vertical images 30, 32 fills the bottom part of the screen 16. FIG. 10 illustrates display of a four 4.5×6" images with aspect ratio 4:3 on 12×12" screen 16. The four images are fitted on a square display filling substantially entire screen 16.

Figure 11:
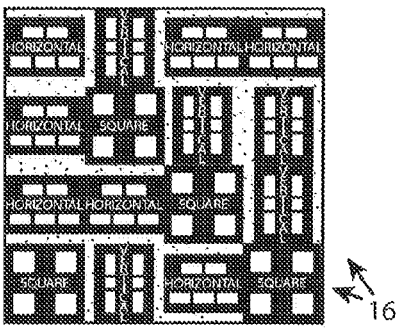
FIG. 11 illustrates a photo layout of thumbnail images of both vertical and horizontal images with a mixture of aspect ratios of 3:2 and 1:1 using the system of this invention.
Figure 12:
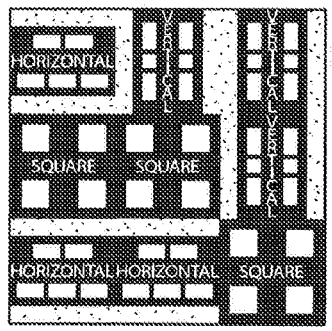
FIG. 12 illustrates a photo layout of thumbnail images of both vertical and horizontal images with a mixture of aspect ratios of 4:3 and 1:1 using the system of this invention.

FIG. 11 illustrates display of multiple thumbnail images with original images being 3×2" and 3×3", having aspect ratios of 3:2 and 1:1 on a 12×12" screen 16. Similarly to other images described above, the images in FIG. 11 are processed, rotated and provided with pillarbox or letterbox mattes in order to utilize the entire viewable area of the screen 16. FIG. 12 illustrates display of nine (three per row and per column) images with original images being 4×3" and 4×4" having aspect ratios of 4:3 and 1:1 on a 12×12" screen. Even though the native format of the images is different, the system of the present invention allows processing and displaying of these images in variations of vertical and horizontal images within one row and one column such that a combination of the images substantially utilizes the entire viewing area of the screen 16.

It should be noted that image rotation is often desirable for certain images, such as those captured with the camera held in the vertical/portrait orientation. The invention utilizes an automatic image rotation algorithm that fits the rotated image entirely within the viewable area of the frame screen 16 or a designated area within a row and column of the screen. It also provides letterboxing and pillarboxing or addition of matte space, to the sides, tops and bottoms of the rotated image. The captured photo images are displayed in a format more consistent with the square display.

The images displayed on the screen 16 are not compromised based on the screen orientation. It is envisioned that larger square screens can be used for various displays or incorporated into current digital photo frame designs to provide an improved visual presentation. The square-formatted screen solves the problem of screen resolution, brightness, color accuracy and other technical requirements by providing a more uniform and coherent photo viewing experience. It is a particular advantage of the invention that it provides for generating consistent image size regardless of the orientation, either vertical or horizontal and display thereof on a frame screen.

When the user is presented with a user interface on the screen 16, the program requests the user to select the desired layout of captured images to be displayed simultaneously on the screen, be it one image or a plurality of images arranged in rows and columns. The system determines the most efficient way of organizing the images on the screen corresponding to a page of a photo album. The system defines the respective size dimensions and position of the vertical and horizontal images on one "page." When necessary, the system rotates the images and adds mattes to specific images so that consistent uniform image sizes are displayed on one page within a given row and column.

The system automatically determines the aspect ratio of the photo images and selects photo images to be displayed on a particular page. In one aspect of the invention, the user interface allows the user to identify and select the photo images corresponding to a particular matching aspect ratio to be displayed on a given page.

In one aspect of the invention, the image processing system provides various predefined layout templates that a user may select to create a digital photo album. The user can select images from the collection of the captured images to various predefined image locations on a selected layout template compatible with the square screen. The system will then automatically adjust the size, placement, rotation, and framing of the images in accordance with parameters specified for the various predefined image locations on the selected template. In another aspect of the invention, the system is designed to arrange the images in chronological order.

It is envisioned that the photography system of the present invention could be equipped, but not required to, with the following items: memory card reader, wi-fi capability, USB Bluetooth connectivity, internal memory, touch-screen operation, AC/DC compatibility and album/screen cover.

A digital image file from any number of sources such as internal memory, memory stick, camera, computer. Internet, CD. DVD etc. enters the Horizontal/Vertical Detector 100 where it is rotated for proper screen orientation. From there it is sent on to the Aspect Ratio/Size Detector 200 which reads the captured image size, aspect ratio and image resolution contained in the Exif (exchangeable image file) metadata and resizes the image to fit the device's display in the single image mode. (See FIGS. 13, 14, 15) It is then sent on to the Page Layout Template Microprocessor 300 and resized, if necessary, by dividing both the screen and the maximum single image size by the principle square roots of 1, 2, 6 and 12 (See FIGS. 13-24) or 3 and 4 (See FIG. 25) to fit into the selected template. The chosen template determines the number of images to be displayed simultaneously and their size. The microprocessor selects the correct number of images for the specified template, places images on screen, Left to Right/Top to Bottom, in chronological order or in any user selected location through the use of a graphical user interface in a manner determined by the device's operating system.

Dividing the height and width of the display screen by the principle square roots listed above, using a 12"×12" display for example, will yield 1, 4, 36 and 144 squares that fit both 3:2 and 4:3 images (See FIGS. 13-24) as well as 9 squares that fit 4:3 and 16 squares for 3:2 images. (See FIG. 25) Of course 1:1 square images fit all six templates perfectly.

Figure 13:
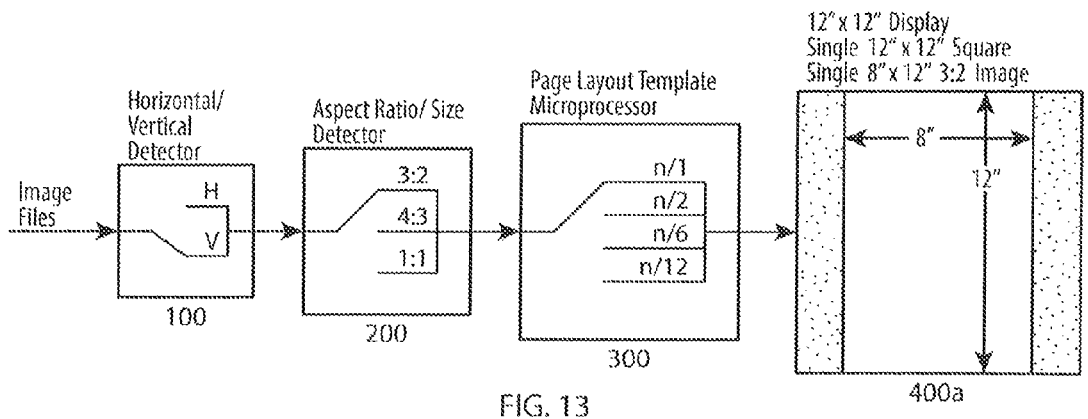
FIGS. 13-25 illustrate the processing steps of this invention for a variety of types and numbers of images.
Figure 14:
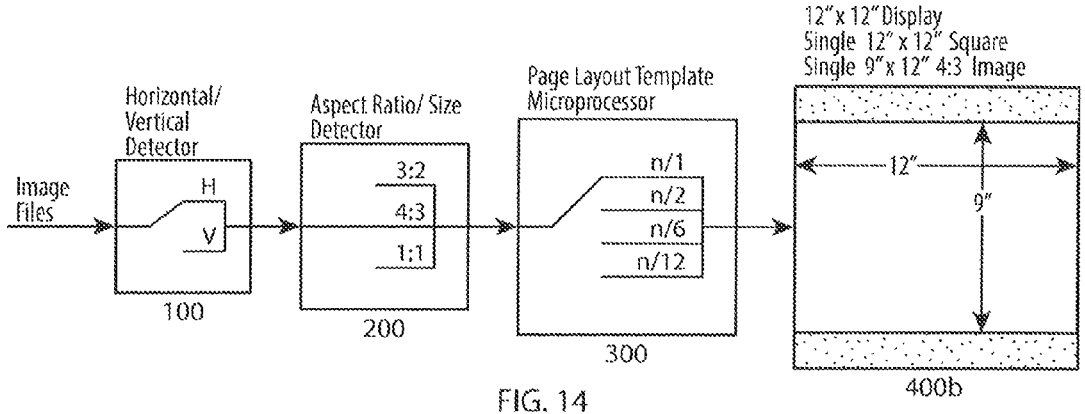
Figure 15:
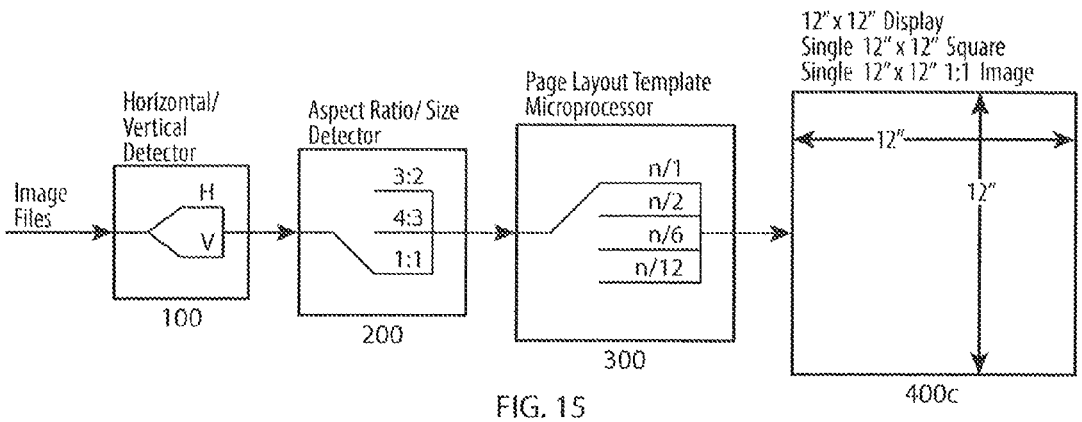
Figure 16:
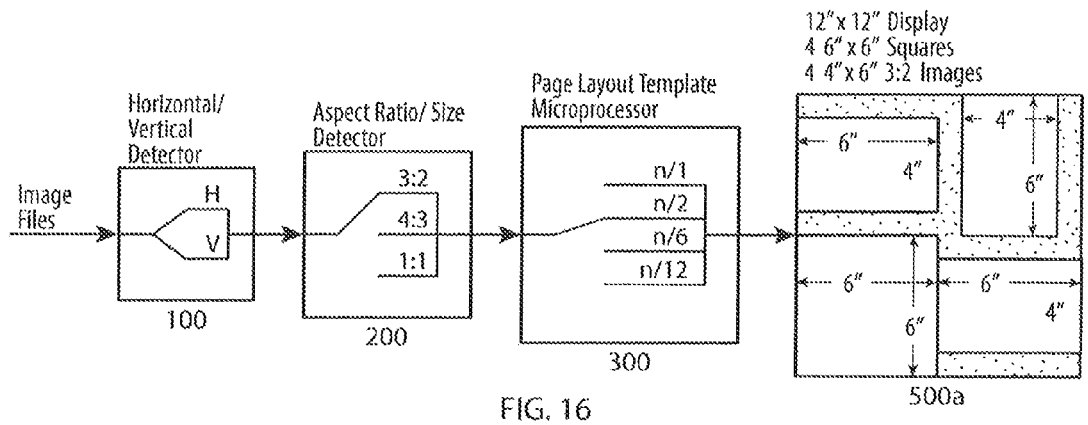
Figure 17:
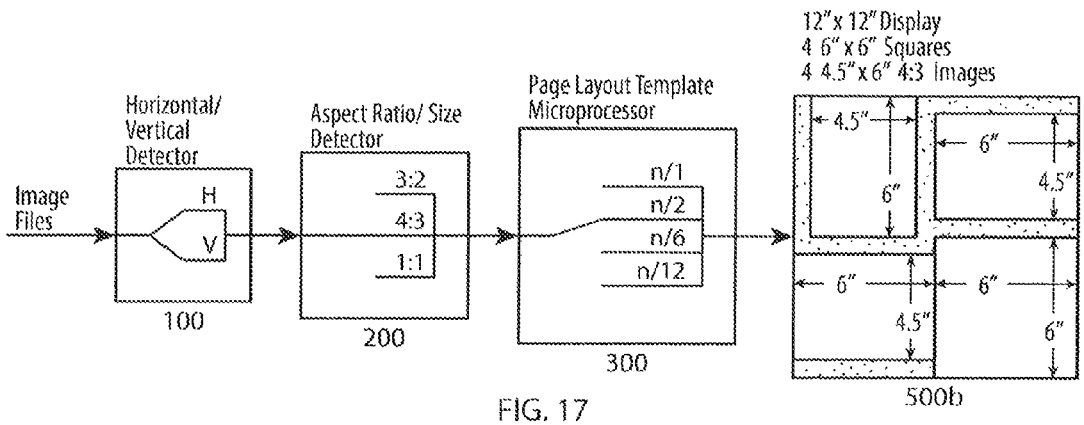
Figure 18:
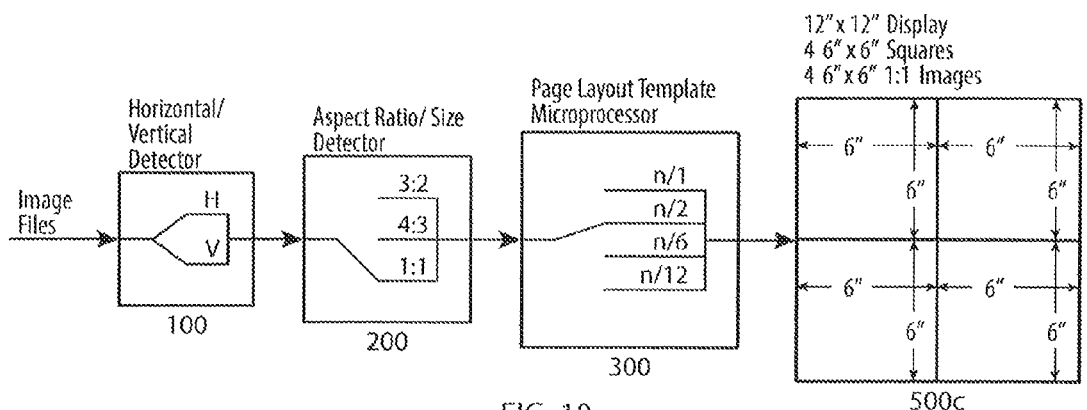
Figure 19:
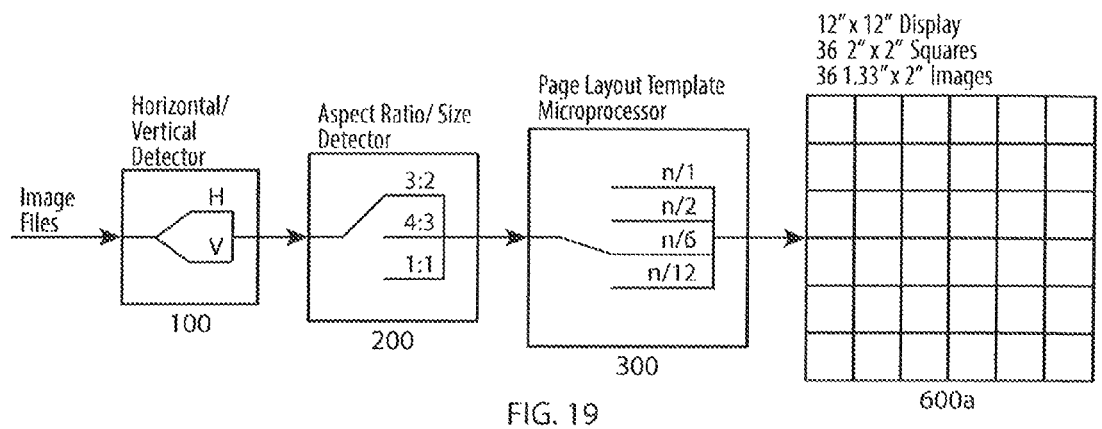
Figure 20:
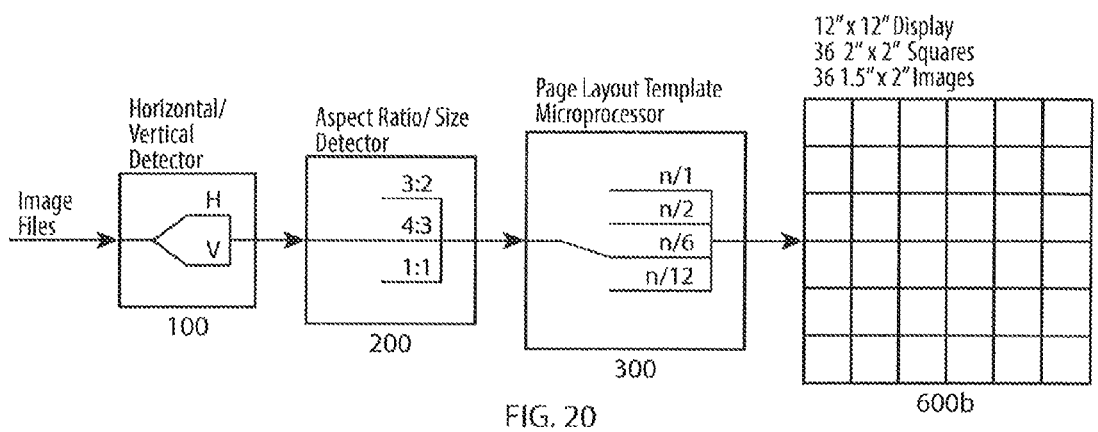
Figure 21:
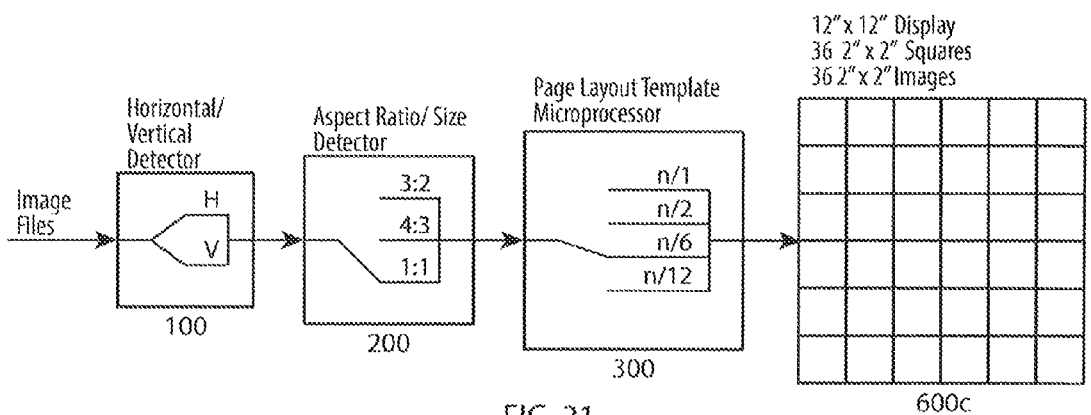
Figure 22:
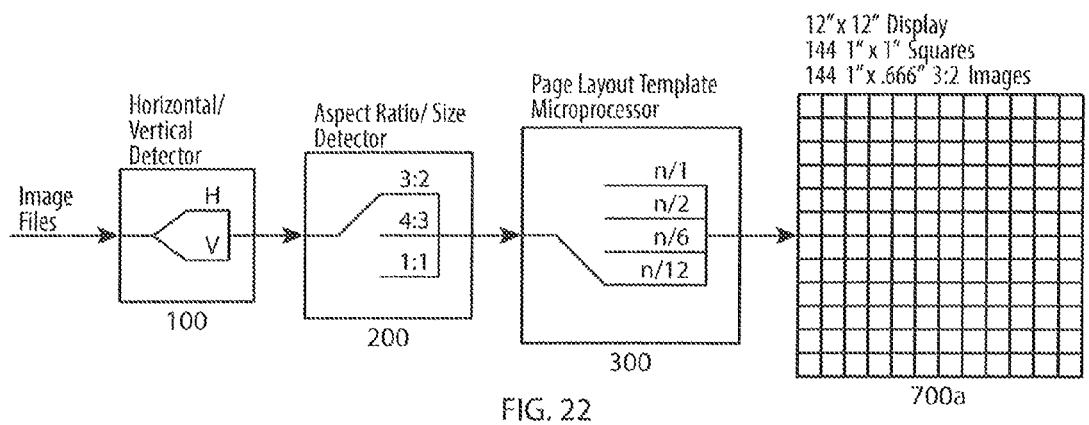
Figure 23:
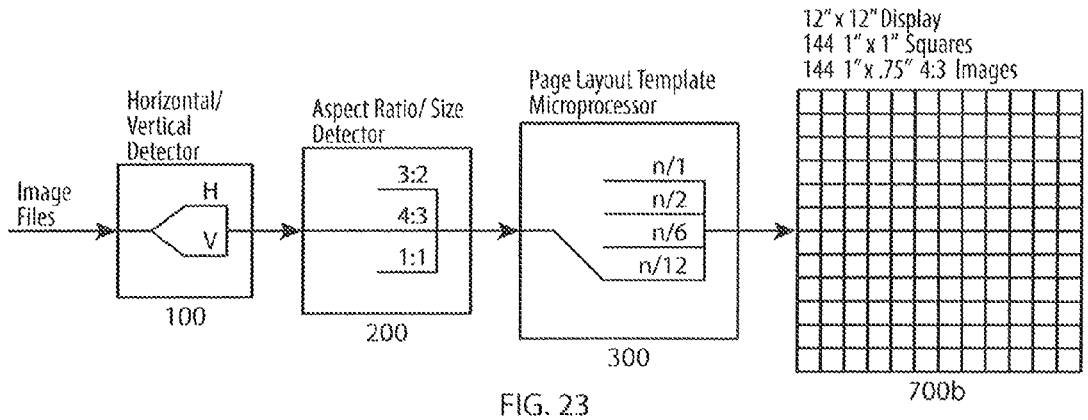
Figure 24:
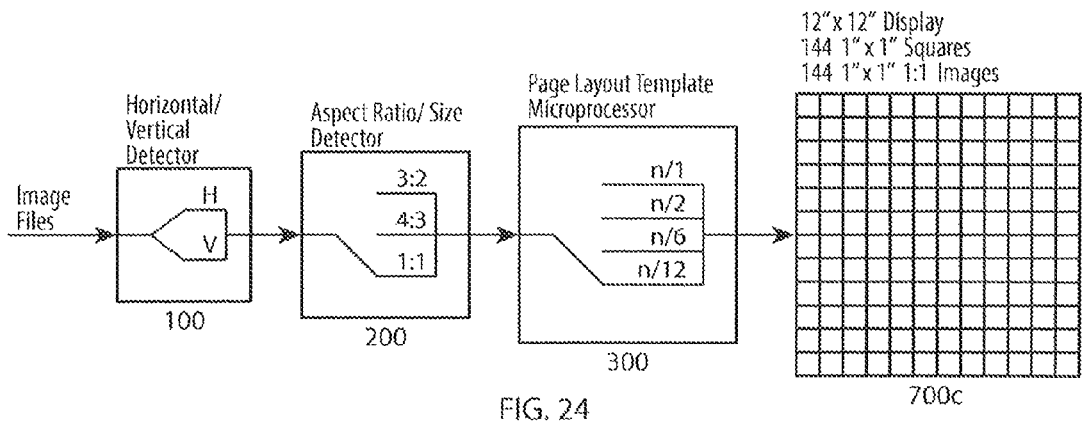

Assuming a 12"×12" display, the individual square sizes and number of squares per template are:
FIGS. 13-15: 12"×12" square size, 1 square;
FIGS. 16-18: 6"×6" square sizes, 4 squares;
FIGS. 19-21: 2"×2" square sizes, 36 squares;
FIGS. 22-24: 1"×1" square sizes, 144 squares.

Figure 25:
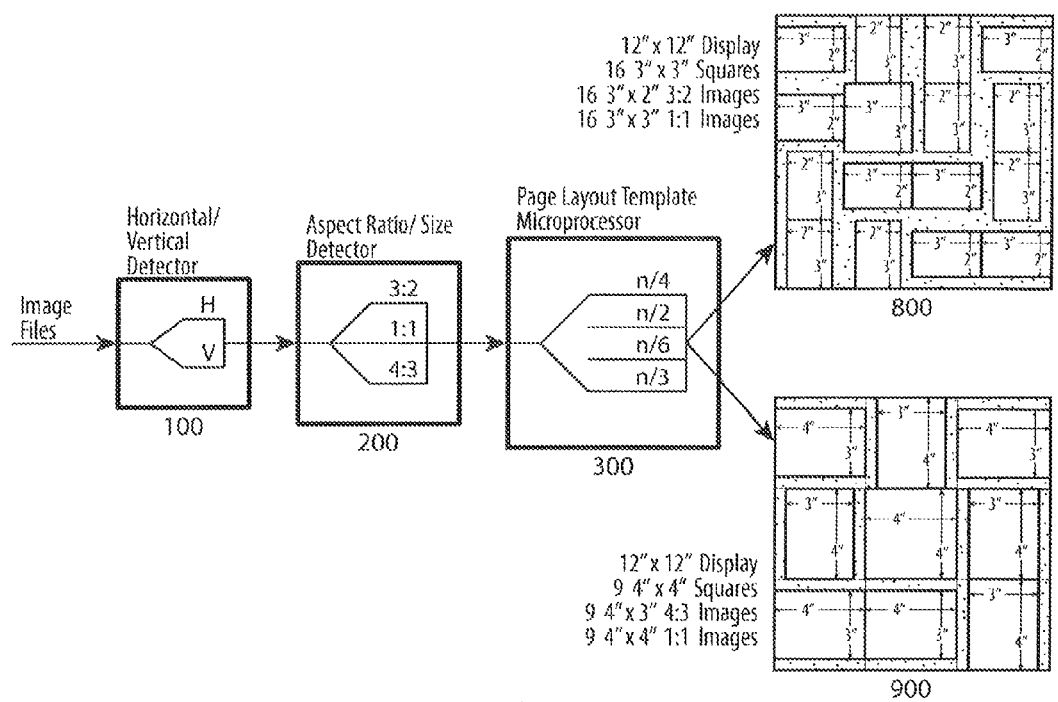

For the aspect ratio specific templates shown in FIG. 25 the sizes and number of squares are:
For 4:3 images: 4"×4" square sizes, 9 squares;
For 3:2 images: 3"×3" square sizes, 16 squares.

By maintaining the integrity of the square shape throughout, and knowing that digital still images of 4:3 and 3:2 proportions can rotate unrestricted within a square screen, this device is able to show multiple, same-sized per aspect ratio images, regardless of orientation, in any desired order within any selected template.

A digital image file from any number of sources such as internal memory, memory stick, camera, computer, Internet, CD, DVD etc. enters the Horizontal/Vertical Detector and is rotated for proper orientation. Next, the captured image aspect ratio and size is detected and converted to single image, full screen size. It is then sent on, to be resized to fit the allotted space determined by the Page Layout Template Module. The PLTM sends info to the microprocessor on the number of images to be displayed, and consequently their required size, and to the display to divide it into the proper number of segments for the selected template. The microprocessor selects the correct number of images for the selected template, places images on screen. Left to Right/Top to Bottom. In chronological order or in any user selected location through the use of a graphical user interface in conjunction with an operating system. Internal memory is provided to store images and an operating system used for selecting and manipulating images according to a program or a list.

The following is a detailed description of FIGS. 13-25:

Since the blocks labeled 100, 200 and 300 are common to all figures their operation will be described first. The explanation of blocks 400*a* thru 900 will be further explored in detail afterward.

Block 100, the Horizontal/Vertical Detector (HVD), reads the attitude information that is stored in a digital image file as part of the meta-data. It uses that information to determine the image orientation and rotates the image for proper placement on the screen of the display device.

Block 200, the Aspect Ratio/Size Detector (ARSD), reads the captured image dimensions and uses that information to determine the aspect ratio based on the relationship of one side to the other. It resizes the image so that the longest side of a rectangular image fits the fixed-sized square screen on the device, which in the case of our example is 12 inches. The short side of the image is sized according to the aspect ratio. For example, an image with a 3:2 aspect ratio would be resized to 12"×8" while a 4:3 image would be resized to 12"×9". For square images both sides of the image are converted to 12 inches.

Block 300, the Page Layout Template Microprocessor (PLTM), has a dual purpose. It divides the 12"×12" display into the required number of grids needed for the chosen number of images to be displayed and divides the image size received from the Aspect Ratio/Size Detector by the same factor and centers it in the appropriate square. For single image display, the image is centered on the screen left to right for vertical images or top to bottom for horizontal images. For multi-image display, it centers the image in the squares created by the selected template and places them sequentially left to right, top to bottom in the order taken or can be overridden by the user to place images in any random order desired.

FIG. 13. Block 100, the HVD, in this instance senses a vertical image, rotates it for proper orientation and passes it on to Block 200 ARSD, which in this instance senses a 3:2 aspect ratio image. The image is resized to 8"×12" 400*a* to fit within the 12"×12" display and centers it left to right.

FIG. 14. Block 100, the HVD, in this instance senses a vertical image, rotates it for proper orientation and passes it on to Block 200 ARSD, which in this instance senses a 3:2 aspect ratio image. The image is resized to 8"×12" 400*b* to fit within the 12"×12" display and centers it top to bottom.

FIG. 15. Block 100, the HVD, senses a orientation of the square image, rotates it for proper orientation and passes it on to Block 200 ARSD, which in this instance senses a 1:1 aspect ratio image. The image is resized to 12"×12" 400*c* to fill the entire 12"×12" display.

Since Blocks 100 and 200 work essentially the same for multi-image display, the explanation of their operation will not be repeated. Please refer to Block 100 and Block 200 notes above for their description.

FIG. 16. The user selects a 4-image layout. Block 300 divides the 12"×12" screen by two, horizontally and vertically, to produce four 6"×6" squares. The 3:2 aspect ratio, 8"×12" images are also divided by two to create four 4"×6" images 500*a*. These images are centered in the resulting squares and placed sequentially, left to right, top to bottom, based on the date and time-captured information contained in the meta-data. The user may also place them selectively, in any desired order.

FIG. 17. The user selects a 4-image layout. Block 300 divides the 12"×12" screen by two, horizontally and vertically, to produce four 6"×6" squares. The 4:3 aspect ratio, 9"×12" images are also divided by two to create four 4.5"×6" images 500*b*. These images are centered in the resulting squares and placed sequentially, left to right, top to bottom, based on the date and time-captured information contained in the meta-data. The user may also place them selectively, in any desired order.

FIG. 18. The user selects a 4-image layout. Block 300 divides the 12"×12" screen by two, horizontally and vertically, to produce four 6"×6" squares. The 1:1 aspect ratio, 12"×12" images are also divided by two to create four 6"×6" images 500*c*. These images are centered in the resulting squares and placed sequentially, left to right, top to bottom, based on the date and time-captured information contained in the meta-data. The user may also place them selectively, in any desired order.

FIG. 19. The user selects a 36-image layout. Block 300 divides the 12"×12" screen by six, horizontally and vertically, to produce thirty-six 2"×2" squares. The 3:2 aspect ratio, 8"×12" images are also divided by six to create thirty-six 1.33"×2" images 600*a*. These images are centered in the resulting squares and placed sequentially, left to right, top to bottom, based on the date and time-captured information contained in the meta-data. The user may also place them selectively, in any desired order.

FIG. 20. The user selects a 36-image layout. Block 300 divides the 12"×12" screen by six, horizontally and vertically, to produce thirty-six 2"×2" squares. The 4:3 aspect ratio, 9"×12" images are also divided by six to create thirty-six 1.5"×2" images 600*b*. These images are centered in the resulting squares and placed sequentially, left to right, top to bottom, based on the date and time-captured information contained in the meta-data. The user may also place them selectively, in any desired order.

FIG. 21. The user selects a 36-image layout. Block 300 divides the 12"×12" screen by six, horizontally and vertically, to produce thirty-six 2"×2" squares. The 1:1 aspect ratio, 12"×12" images are also divided by six to create thirty-six 2"×2" images 600*c*. These images are centered in the resulting squares and placed sequentially, left to right, top to bottom, based on the date and time-captured information contained in the meta-data. The user may also place them selectively, in any desired order.

FIG. 22. The user selects a 144-image layout. Block 300 divides the 12"×12" screen by twelve, horizontally and vertically, to produce one hundred forty-four 1"×1" squares. The 3:2 aspect ratio, 8"×12" images are also divided by twelve to create one hundred forty-four 0.66"×1" images 700*a*. These images are centered in the resulting squares and placed sequentially, left to right, top to bottom, based on the date and time-captured information contained in the meta-data. The user may also place them selectively, in any desired order.

FIG. 23. The user selects a 144-image layout. Block 300 divides the 12"×12" screen by twelve, horizontally and vertically, to produce one hundred forty-four 1"×1" squares. The 4:3 aspect ratio, 9"×12" images are also divided by twelve to create one hundred forty-four 0.75"×1" images 700*b*. These images are centered in the resulting squares and placed sequentially, left to right, top to bottom, based on the date and time-captured information contained in the meta-data. The user may also place them selectively, in any desired order.

FIG. 24, 700*c* The user selects a 144-image layout. Block 300 divides the 12"×12" screen by twelve, horizontally and vertically, to produce one hundred forty-four 1"×1" squares. The 1:1 aspect ratio, 12"×12" images are also divided by twelve to create one hundred forty-four 1"×1" images 700*c*. These images are centered in the resulting squares and placed sequentially, left to right, top to bottom, based on the date and time-captured information contained in the meta-data. The user may also place them selectively, in any desired order.

The two image arrangements shown in FIG. 25, 800 and 900, are aspect ratio specific for 3:2 or 4:3 images but both can be used for 1:1 aspect ratio images.

In FIG. 25, 800, 3:2/1:1 images leave Block 200 properly oriented and in their respective sizes of 8"×12"/12"×12". In Block 300, the PLTM divides the 12"×12" screen by a factor of four to create sixteen 3"×3" squares. The 3:2, 8"×12" and the 1:1, 12"×12" images are also divided by four to create sixteen 2"×3"/3"×3" images that can be intermixed or viewed separately. These images are centered in the resulting squares and placed sequentially, left to right, top to bottom, based on the date and time-captured information contained in the metadata. The user may also place them selectively, in any desired order.

In FIG. 25, 900, 4:3/1:1 images leave Block 200 properly oriented and in their respective sizes of 9"×12"/12"×12". In Block 300, the PLTM divides the 12"×12" screen by a factor of three to create nine 4"×4" squares. The 4:3, 9"×12" and the 1:1, 12"×12" images are also divided by three to create nine 3"×4"/4"×4" images that can be intermixed or viewed separately. These images are centered in the resulting squares and placed sequentially, left to right, top to bottom, based on the date and time-captured information contained in the metadata. The user may also place them selectively, in any desired order.

It is important to note that, with the exception noted for FIG. 25, 800 and 900, which are aspect ratio specific for the rectangular 3:2 and 4:3 images but not 1:1 square images, all images on FIGS. 13-24 are universally interchangeable, all images having the same aspect ratio are the same size on a "page", there are no restrictions on screen placement due to orientation and different aspect ratio images may be combined in a mixed manner within the specified templates.

Many changes and modifications can be made in the system of the present invention without departing from the spirit thereof. I, therefore, pray that my rights to the present invention be limited only by the scope of the appended claims.

I claim:

1. A method performed by a physical system comprising a digital photo frame and an associated computer program executing device, the method comprising:
   providing a square display screen in a square digital photo frame;
   uploading images captured by an external source onto the square digital photo frame;
   on the square display screen, presenting a user interface responsive to user input requesting a layout of photographic images on a page of the square digital photo frame;
   requesting the user to select a desired layout of captured photo images to be displayed simultaneously on the page of the square digital photo frame;
   organizing the photo images on the page, while defining the respective size dimensions and position of the vertical and/or horizontal photo images on the page, wherein said organizing is effected in a random user-selected arrangement of said photo images;
   providing a page layout template microprocessor configured to divide the square display screen into a user-determined number of equal size square grid cells corresponding to user-selected number of images to be displayed on the square display screen;
   processing the photo images of various aspect ratios and orientation to fit within each grid cell of the square display screen irrespective of the aspect ratios of the photo images while maintaining equally sized horizontal and vertical images for each aspect ratio irrespective of the original orientation of the captured photo images, display screen orientation, or the order in which the photo images are placed on the screen; and
   on the page of the square digital photo frame, displaying the organized photo images while utilizing maximum viewable area of the square display screen without distorting the photo images, wherein said organized photo images are displayed in any user-selected order, without requiring clustering of images according to their original orientation or aspect ratios.

2. The method of claim 1, further comprising a step of automatically determining aspect ratio of the photo images and selecting photo images having matching aspect ratio to be displayed on a specific page thereby producing consistent image size per aspect ratio irrespective of original orientation of the captured photo images.

3. The method of claim 1, comprising a step of presenting a user interface responsive to the user input requesting the user to select the photo images corresponding to the determined aspect ratio for displaying on the page.

4. The method of claim 1, comprising a step of organizing the photo images in rows and columns to be displayed on a specific page irrespective of photo images being captured in horizontal or vertical formats.

5. The method of claim 1, comprising a step of processing a single image display by centering a vertical image left to right and centering a horizontal image top to bottom.

6. The method of claim 1, comprising a step of processing multi-image display by centering each image within a grid cell and placing the images sequentially in order that the images were taken or in a random order selected by a user.

7. A machine readable non-transitory medium for arranging graphic objects on a page of a digital photo frame, the machine readable medium storing machine-readable instructions causing a machine to perform operations comprising:
   uploading images captured by an external source onto a square digital photo frame;
   on the page of the square digital photo frame having a square display screen, presenting a user interface responsive to user input requesting a layout of graphic objects on the page of the square digital photo frame;
   requesting the user to select a desired layout of graphic objects to be displayed simultaneously on the page of the square digital photo frame;
   organizing the graphic objects on the page, while defining the respective size dimensions and position of the vertical and/or horizontal graphic objects on the page of the square digital photo frame, wherein said organizing is effected in a random arrangement of said photo images in a user-selected manner;
   providing a page layout template microprocessor configured to divide the square display screen into a user-determined number of equal size square grid cells corresponding to user-selected number of images to be displayed on the square display screen;
   processing the photo images of various aspect ratios and orientation to fit within the square display screen and irrespective of the aspect ratios of the photo images while maintaining equally sized horizontal and vertical images for each aspect ratio irrespective of the original orientation of the captured photo images, the square display screen orientation, or the order in which the photo images are placed on the screen; and
   on the page of the square digital photo frame, displaying the organized graphic objects while utilizing maximum viewable area of the square display screen without distorting the photo images, wherein said organized photo images are displayed in any user-selected order, without requiring clustering of images according to their original orientation or aspect ratios.

8. The machine readable medium of claim 7, wherein the machine readable instructions cause the machine to automatically determine aspect ratio of the graphic objects and select graphic objects having matching aspect ratio to be displayed on a specific page of the square digital photo frame, thereby producing consistent image size per aspect ratio irrespective of original orientation of the captured photo images.

9. The machine readable medium of claim 7, wherein the machine readable instructions cause the machine to present a user interface responsive to the user input requesting the user to select the graphic objects corresponding to the determined aspect ratio for displaying on the page of the square digital photo frame.

10. The machine readable medium of claim 7, wherein the machine readable instructions cause the machine to organize the graphic objects in rows and columns to be displayed on a specific page irrespective of graphic objects being captured in horizontal or vertical formats.

11. The machine readable non-transitory medium of claim 7, wherein the machine-readable instructions causing a machine to perform operations comprising processing a single image display by centering a vertical image left to right and centering a horizontal image top to bottom.

12. The machine readable non-transitory medium of claim 7, wherein the machine-readable instructions causing a machine to perform operations comprising processing multi-image display by centering each image within a grid cell and placing the images sequentially in order that the images were taken or in a random order selected by a user.

13. At least one computer-readable non-transitory medium having electronically-readable program code embodied therein, the electronically-readable program code adapted to be executed by an electronic device to implement a method comprising:
  uploading images captured by an external source onto a square digital photo frame;
  on a display of the square digital photo frame having a square display screen, presenting a user interface responsive to user input requesting a layout of photographic images on a page of the square digital photo frame;
  requesting the user to select a desired layout of captured photo images to be displayed simultaneously on the page of the square digital photo frame;
  determining aspect ratio of the photo images and selecting photo images having matching aspect ratio to be displayed on a specific page;
  organizing the photo images on the page, while defining the respective size dimensions and position of the vertical and/or horizontal photo images on the page, wherein said organizing is effected in a random user-selected arrangement of said photo images;
  providing a page layout template microprocessor configured to divide the square display screen into a user-determined number of equal size square grid cells corresponding to user-selected number of images to be displayed on the square display screen;
  processing the photo images of various aspect ratios and orientation to fit within the square display screen irrespective of the aspect ratios, display screen orientation, and of original orientation of the captured photo images while maintaining equally sized horizontal and vertical images for each aspect ratio irrespective of the original orientation of the captured photo images or the order in which the photo images are placed on the square display screen; and
  on the page of the square digital photo frame, rendering the organized photo images layout in the user interface while utilizing maximum viewable area on the square display screen without distorting the photo images, wherein said organized photo images are displayed in any user-selected order, without requiring clustering of images according to their original orientation or aspect ratios.

14. The at least one computer-readable medium of claim 13, comprising a program code adapted to be executed by an electronic device to implement a step comprising: organizing the photo images in uniform rows and columns to be displayed on a specific page irrespective of photo images being captured in horizontal or vertical formats.

15. The at least one computer-readable medium of claim 13, comprising a program code adapted to be executed by an electronic device to implement a step comprising processing a single image display by centering a vertical image left to right and centering a horizontal image top to bottom.

16. The at least one computer-readable medium of claim 13, comprising a program code adapted to be executed by an electronic device to implement a step comprising processing multi-image display by centering each image within a grid cell and placing the images sequentially in order that the images were taken or in a random order selected by a user.

17. A photography system, comprising: a square digital photo frame having a square display screen, a memory storing electronically-readable instructions, a data processing unit coupled to the memory, operable to execute the instructions, and based at least in part on the execution of the instructions operable to perform operations comprising the steps:
  uploading images captured by an external source onto the square digital photo frame;
  on the square display screen of the square digital photo frame, presenting a user interface responsive to user input requesting a layout of photographic images on a page of the square digital photo frame;
  requesting the user to select a desired layout of captured photo images to be displayed simultaneously on the page of the square digital photo frame;
  determining aspect ratios of the photo images and selecting photo images having aspect ratios to be displayed on a specific page, organizing the photo images on the page, while defining the respective size dimensions and position of the vertical and/ or horizontal photo images on the page, wherein said organizing is effected in a random user-selected arrangement of said photo images;
  providing a page layout template microprocessor configured to divide the square display screen into a user-determined number of equal size square grid cells corresponding to user-selected number of images to be displayed on the square display screen;
  processing the photo images of various aspect ratios and horizontal or vertical orientation to fit within the square display screen irrespective of the aspect ratios; and
  on the page of the square digital photo frame, rendering the organized photo images layout in the user interface while utilizing maximum viewable area on the screen without distorting the captured photo images while producing consistent image size per aspect ratio while maintaining equally sized horizontal and vertical images for each aspect ratio irrespective of the original orientation of the captured photo images, display screen orientation, or the order in which the photo images are placed on the square display screen, wherein said organized photo images are-displayed in any user-selected order, without requiring clustering of images according to their original orientation or aspect ratios.

18. The system of claim 17, operable to execute the instructions operable to perform operations comprising the steps: automatically determining the aspect ratio of the photo images and selecting photo images having matching ratio to be displayed on a specific page.

19. The system of claim 17, operable to execute the instructions operable to perform operations comprising the steps: presenting a user interface responsive to the user input requesting the user to select the photo images corresponding to the determined aspect ratio for displaying on the page.

20. The system of claim 17, operable to execute the instructions operable to perform operations comprising the steps of: organizing the photo images in uniform rows and columns to be displayed on a specific page irrespective of photo images being captured in horizontal or vertical formats.

21. The system of claim 17, operable to execute the instructions operable to perform operations comprising the steps: processing a single image display by centering a vertical image left to right and centering a horizontal image top to bottom.

22. The system of claim 17, operable to execute the instructions operable to perform operations comprising the steps: processing multi-image display by centering each image within a grid cell and placing the images sequentially in order that the images were taken or in a random order selected by a user.

* * * * *